United States Patent
Khudenko

[11] Patent Number: 6,048,459
[45] Date of Patent: Apr. 11, 2000

[54] METHOD AND APPARATUS FOR FLUIDIZATION OF PARTICULATE BED MATERIALS

[75] Inventor: Boris Mikhailovich Khudenko, Atlanta, Ga.

[73] Assignee: MOCKBA Corporation, Atlanta, Ga.

[21] Appl. No.: 09/289,406

[22] Filed: Apr. 9, 1999

[51] Int. Cl.$^7$ .................................................... C02F 3/06
[52] U.S. Cl. ..................... 210/617; 210/622; 210/629; 210/661; 210/150; 210/196
[58] Field of Search .................... 210/617, 618, 210/629, 605, 630, 622, 661, 150, 151, 194, 196, 220

[56] References Cited

U.S. PATENT DOCUMENTS

| | | | |
|---|---|---|---|
| 4,009,098 | 2/1977 | Jeris | 210/618 |
| 4,177,144 | 12/1979 | Hickey et al. | 210/618 |
| 4,278,546 | 7/1981 | Roesler | 210/629 |
| 4,482,458 | 11/1984 | Rovel et al. | 210/617 |
| 5,019,268 | 5/1991 | Rogalla | 210/151 |
| 5,330,652 | 7/1994 | Goldman et al. | 210/618 |
| 5,472,670 | 12/1995 | Jönsson | 210/150 |
| 5,494,574 | 2/1996 | Unterman et al. | 210/618 |
| 5,800,710 | 9/1998 | Mähl | 210/667 |
| 5,849,194 | 12/1998 | Yamasaki et al. | 210/617 |

*Primary Examiner*—Christopher Upton

[57] ABSTRACT

A method for fluidization of a particulate bed material in a fluidized bed reactor with an upflow of fliud being treated, wherein a step of recycling said treated fluid is provided and further comprising the steps of (a) uniformly collecting at least a portion of the fluid above the fluidized bed and lifting this fluid by at least one gaslift having an intake above the bed, and (b) recycling the lifted fluid under the bed via at least one downcomer positioned within the bed. An generic apparatus for conducting the method steps in a variety of applications is also provided. The fluidized bed reactor can be used for chemical, physical chemical, biological processes, and combinations thereof in the chemical processing, food, environmental and other industries.

25 Claims, 3 Drawing Sheets

METHOD AND APPARATUS FOR FLUIDIZATION OF PARTICULATE BED MATERIALS

FIELD OF THE INVENTION

This is a method and apparatus for fluidization of particulate bed materials in adsorption and ion exchange processes, chemical conversions with solid particles and catalysts, biological conversions with particulate support media, and/or biological flocks and biological granules, and in solid-liquid separation processes.

PRIOR ART

Many processes in chemical, petrochemical, pharmaceutical, food processing, water and wastewater treatment and pollution control industries make use of fluidized beds. Terminology used to describe these processes varies depending on a process modification and preferences of the skilled in the arts. For example, fluidized beds can be called expanded beds, extended beds, suspended sludge blankets, or otherwise. Fluidized beds can be made of distinct solid particles, flocculent particles, biological particles and combinations of solid particles and biological particles, liquid droplets, and other dispersed phase materials. Examples of distinct solid particles include granular activated carbon, sand, coal, metal powders and particles, particles made of ion exchange resins, various solid catalysts. Flocculent particles can be formed by multivalent metal ions, usually iron and/or aluminum. Organic polymers, cationic, anaionic or nonpolar, and inorganic polymers, for example silicates, can be used in various combinations with metal salts, each other, or separately. Biological particles are made mainly of microorganisms held together with a gelatinous material thus making flocks or granules.

Depending on the process specifics, the bed should be fluidized between the minimum and maximum allowable expansions. The maximum allowable expansion is achieved by sizing the horizontal crossection of the reactor for the maximum flow rate and the upflow velocity corresponding to the specified maximum expansion rate. The minimum expansion rate is usually maintained by recycling a portion of the effluent from the reactor back to the influent lines. This involves additional external pipes and pumps. The major disadvantages of the effluent recycling are as follows:

When an occasional excessive expansion of the bed occurs, the particles leave the reactor and are subjected to strong shear and size reduction in external piping and in pumps. These particles are eventually lost from the bed.

The previous disadvantage may be partially alleviated by providing a solid-liquid separation step after the fluidization step. However, the separation step should treat the influent and recycle flows combined. This usually requires large and expensive separation means.

In some systems, for example in anaerobic upflow suspended sludge blanket biological reactors (USBR) the recycle flow and the size of the clarifiers for solid-liquid separation are reduced by intermittent fluidization of a part of the fluidized bed in the plan area of the reactor. This requires additional complex and expensive controls, and complicates the system operation.

Due to the lack of very low-head pumps, the external recycle pumps develop excessive pressure and consume excessive power.

In many fluidized bed systems, the uniform distribution of the influent and the recycle flows under the bed and uniform collection of the fluid above the bed are difficult to achieve. Accordingly, short-circuiting streams of the treated fluid and upwelling of the bed material occur. The short-circuiting reduces the treatment efficiency (for example, chemical, biological, or physical chemical conversions), while upwelling can cause the loss of media from the bed.

Main objectives of the present invention are to eliminate disadvantages of the prior art. Other objectives will become apparent from the ensuing specification.

SUMMARY OF INVENTION

This is a method for fluidization of a particulate bed material in a fluidized bed reactor with an upflow of fliud being treated while passing across the fluidized bed from bottom to an upper level of the bed, wherein a step of recycling the treated fluid is provided and further comprising the steps of a) uniformly collecting at least a portion of the fluid at or above the upper level of the bed and lifting the fluid by at least one gaslift having an intake at the upper level of the bed, and b) recycling the lifted fluid under the bed via at least one downcomer positioned within the bed.

In this method the particulate bed material is selected from the group consisting of sand, coal, granular activated carbon, catalyst particles, ion exchange resin, synthetic adsorption media, flocculent mineral particles, flocculent mineral particles with polymers, inorganic particles, organic particles, flocks of biomass, granules of biomass, biomass grown on solid support particles, suspended or emulsified particles, metal particles, and combinations thereof The fluid is selected from a group consisting of water, wastewater, aqueous solutions of inorganic or organic constituents, nonaqueous solutions of inorganic and organic constituents, nonaqueous liquds, nonaqueous solutions of organic or inorganic constituents, and combinations thereof. The treatment is selected from the group consisting of chemical treatment, physical chemical treatment, biological treatment, and combinations thereof. The biological treatment is selected from a group consisting of at least one aerobic step, at least one anoxic step, a facultative step, at least one anaerobic step, at least one biotic-abiotic step, and combinations thereof.

The operation of this fluidized bed is selected from the group consisting of continuous operation, continuous operation with flow equalization, batch operation, semi-batch operation, and combinations thereof.

The method further provides a step of distributing the recycled fluid into essentially uniform upflow streams under the fluidized bed. The uniform distribution of the upflow streams is provided by deflecting the recycled fluid from at least one bottom pan with flow baffles.

The method further provides steps of gas separation, fluid calming at the exit from said airlift, flow rate control in said at least one airlift, mixing said fluidized bed, and solid-liquid separation for said fluid above said fluidized bed.

This is also an apparatus for fluidizing particulate material by a fluid being treated in a fluidized bed reactor with said bed having an upper level and a bottom and said apparatus having a recycle of the treated fluid under the bottom of the bed and further comprising at least one airlift having intake at or above the upper level of the bed and at least one downcomer in hydraulic communication with the airlift, the downcomer extending essentially to the bottom of the bed.

The hydraulic communication is a box to which said at least one airlift and said at least one downcomer are attached. The apparatus is further provided with a floatation means for at least one airlift and at least one downcomer in hydraulic communication with the airlift. The apparatus is also provided with a gas separation section and/or an extension section to said airlift, a mixing means within said fluidized bed, a bottom pan having flow baffles. At least one of the flow baffles is a non-clog baffle. The downcomer can be a telescoping downcomer.

The apparatus can be provided with functional treatment zones selected from the group consisting of at least one zone adjacent to said fluidized bed reactor, at least one zone built-in said fluidized bed reactor, at least one zone extended under said fluidized bed reactor, and combinations thereof.

It is understood that any suitable gas can be used in this system. Air is very convenient in many applications and term airlift is more common. Accordingly, terms gaslift and airlift are used herein interchangeably with the understanding that actual selection of gas type is done by the skilled in arts on the basis of complex considerations for a particular application.

PREFERRED EMBODIMENTS

Figure 1:
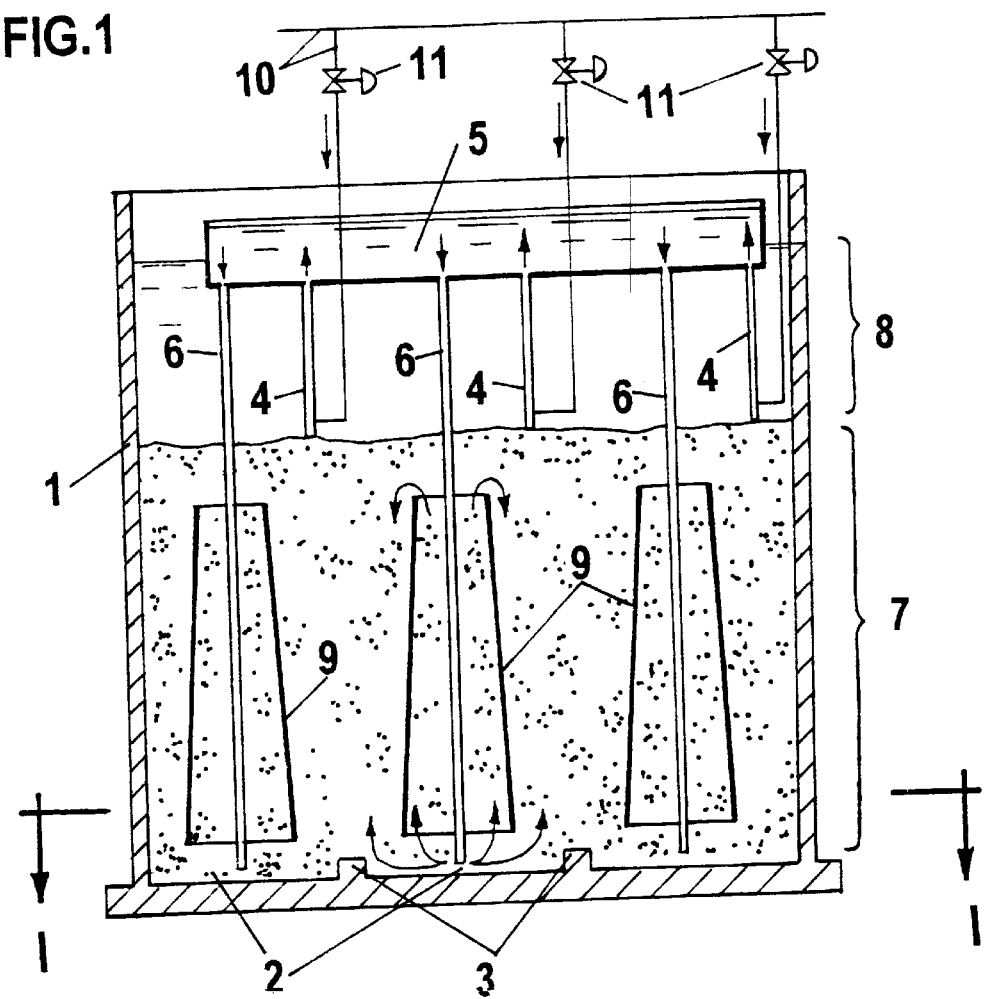
FIG. 1 is a cross-sectional view I—I in FIG. 2 showing fluidized bed reactor with flow recycle by airlifts and downcomers within the reactor.
Figure 2:
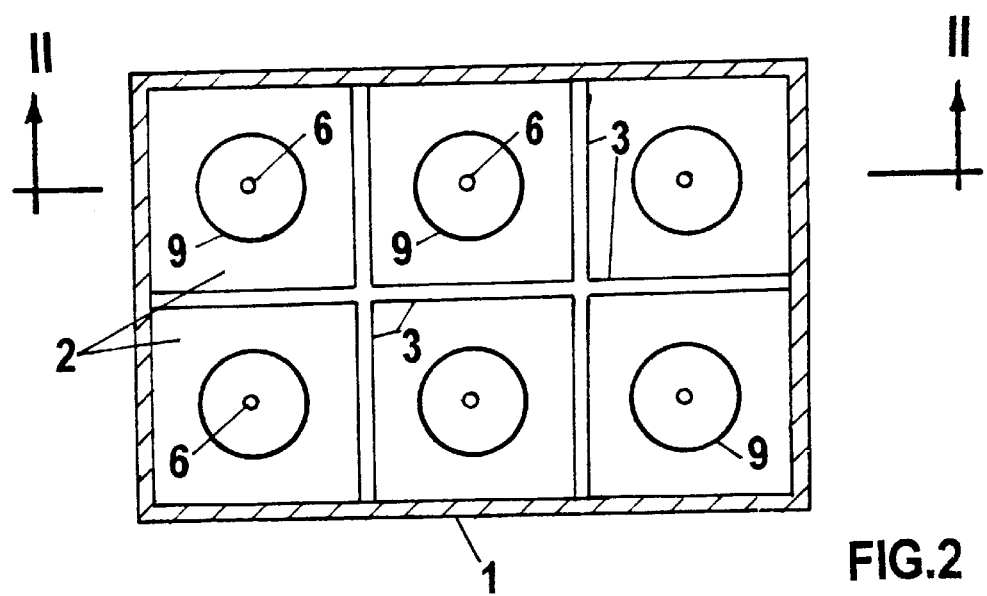
FIG. 2 is a plan view along lines II—II in FIG. 1.

Referring now to FIGS. 1 and 2, there is shown a reactor comprising a reactor vessel 1 with the bottom divided into bottom panels 2 having flow baffles 3, fluidized bed 7 made of fluidizable particles, a clear liquid layer 8 above the fluidized bed 7, airlifts 4 connected to a box 5 at the top of the tank 1 and having water level at a higher elevation than the water level in tank 1, and downcomers 6 originating at the box 5 bottom and extending to the lower end of the bed 7 some distance from the bottom panels 2. The air lines 10 are connected to airlifts 4 and are provided with valves 11 for controlling or shutting off the air flow. Optionally, mixing pyramids or cones 9 can be provided.

The apparatus of FIGS. 1 and 2 is operated as follows. The aqueous solution containing the materials to be treated is fed in the reactor 1 under the fluidized bed 7. The bed 7 is fluidized by the influent flow and the recycle flow also fed under the fluidized bed via downcomers 6. Liquid discharging from the downcomers strikes the bottom panels 2 and considerably rapidly flows to the flow baffles 3 wherein it is deflected in the upward direction. The fluidized bed is expanded by the upward flows to the design upper level above which a clear layer 8 starts. Layer 8 extends from the top of the fluidized bed to the top liquid level in the tank 1.

A portion of the clear fluid, which is considerably free from the particles of the fluidized bed 7, is taken up by airlifts 4 and is fed to the box 5 and further is transferred to the bottom of the fluidized bed to produce the required bed expansion. A portion of the clear fluid equal to the influent flow is discharged from the reactor.

Optionally, mixing pyramids or cones 9 can be provided and used for mixing the contents of the fluidized bed and for controlling the flows of liquid and solid phases within the fluidized bed. The effects associated with this device are described in our previous U.S. Pat. No. 4,472,358, this patent is made a part of the present disclosure by inclusion. Additional mixing can be produced by recycling at least a portion of fluidized particles, especially smaller and lighter fraction, together with the fluid being recycled.

Influent and effluent lines are not shown in FIGS. 1 and 2. Optionally, a means for solid-liquid separation, for example a clarifier, can be accommodated at the top of the reactor. The separated solids can optionally be retained in the reactor. These well known elements do not need to be described for this disclosure to be enabling.

Only mild shearing forces are applied to particles in the airlift-downcomer recycle system, therefore the size reduction and the material loss are greatly reduced. The amount of effluent from the reactor is reduced to the influent flow and the solid-liquid separation requirements, if any, are also reduced. The use of low-head airlifts reduces the usage of energy and the shear stress applied to the particles. The system is capable of uniform liquid distribution under and above the fluidized bed. There is an additional unexpected benefit of inside-the-reactor recycle: the flow within the bed is the sum of the influent and the recycle flows, while above the bed the flow is only the influent flow. Accordingly, the flow velocity within the bed is greater than that above the bed, thus the ability of the flow above the bed to suspend particles is abruptly reduced thus reducing the particle loss.

Figure 3:
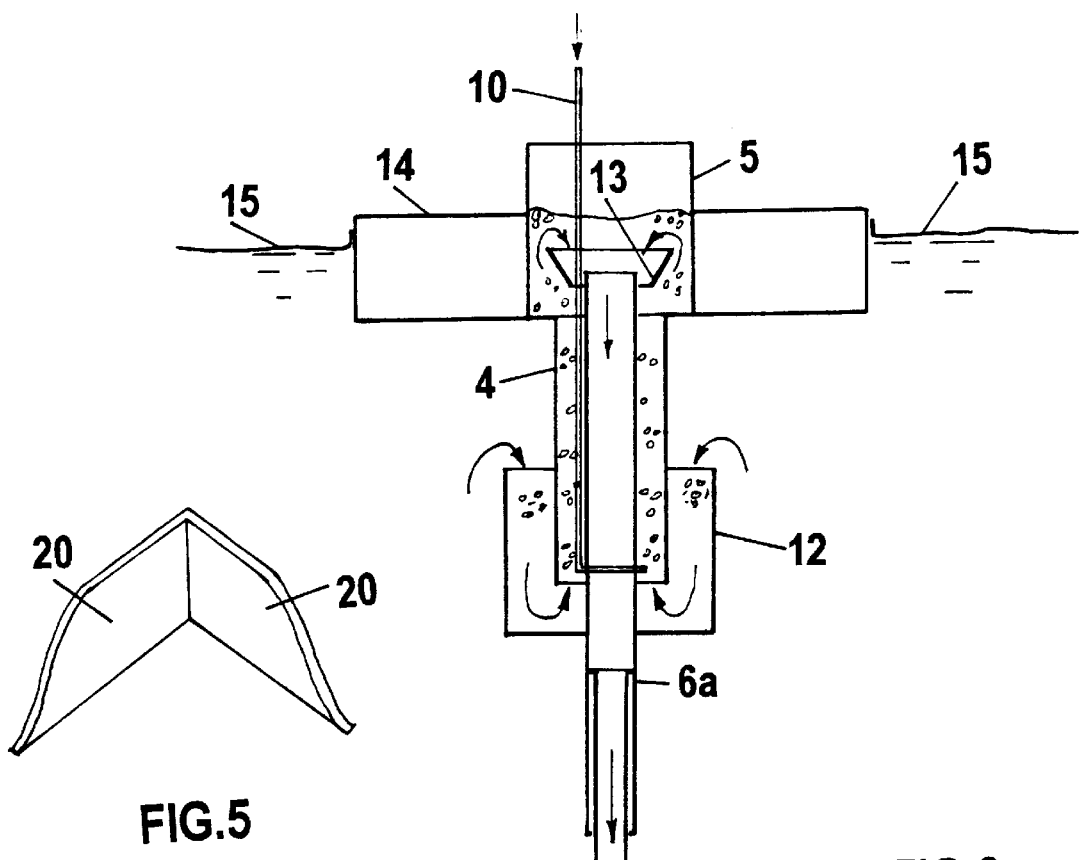
FIG. 3 is an assembly of an airlift and a downcomer for the fluid recycle in present fluidized bed reactors.

Referring now to FIG. 3, there is shown an alternative airlift-downcomer assembly for the use in the present fluidized bed reactors. This assembly comprises an airlift section 4 with air line 10, a box 5 to which airlift 4 is connected, a downcomer optionally made of telescoping sections 6a and 6b and provided with a support tooth 6c at the tank bottom. Optional features of this assembly include a gas separation section 12 (to be used when a gas different than the gas used in gaslift 4 is used or generated in the reactor), a calming baffle 13 made of inclined plates or a cone, or a pyramid, a float 14 for supporting a floating assembly in the reactor, and a membrane 15, for example, a flexible plastic membrane for retaining and collecting a gas different than the gas used in the gaslift 4. The collected gas can be used or generated in the reactor (for example, a gas can be added to a liquid for fluidization of the bed, or a gas, such as digestion gas in anaerobic reactors, can be generated within the recator. Bottom panels 2 can also be integrated into the floating airlift-downcomer assembly. There can be spaces, or breaks, between the floating bottom panels 2. The floating version of the airlift-downcomer assembly is convenient in reactors combined with equalization tanks, and in batch reactors with fluidized beds. A skilled in the arts is provided herein with enabling teaching to design a fixed (non-floating) assembly without gas collection membrane or with flexible or rigid membrane 15.

The assembly of FIG. 3 is operated as follows. One or several assemblies are installed in a fluidized bed reactor similarly to that shown in FIG. 1 but having a separate box 5 for each airlift and downcomer. Liquid recycle is accomplished in a similar way and its description will not be repeated. When gas in the reactor needs to be separated from the air (or other gas) in the airlift, the optional gas separation section having the intake at the upper end is used. Liquid in this section flows down at a velocity less than the float up velocity of the bubbles being separated. Section 12 is also beneficial in cases of shallow clear liquid layer 8. It allows submerging the intake of the airlift section 4 under the top level of the fluidized bed 7 without entraining the bed particles. In such a case section 12 can be called an airlift extension section because it increases the airlift length and efficiency. It is understood that sections 12 and 4 can also be presented as a U-tube. When the airlift-downcomer assembly is installed on floats 14 and its elevation in the tank changes in time with the changing water depth, the telescopic downcomer having sliding sections 6a and 6b provides a compensation for the changing water depth. When there is a need to retain or collect gases in the reactor, membrane 15 can be installed. This membrane will tightly embrace a single or multiple airlift-downcomer assemblies as described herein. The membrane 15 will also be attached to the tank 4 walls and any other built-in units, for example clarifiers. Such arrangements are obvious to the skilled in the arts.

Figure 4:
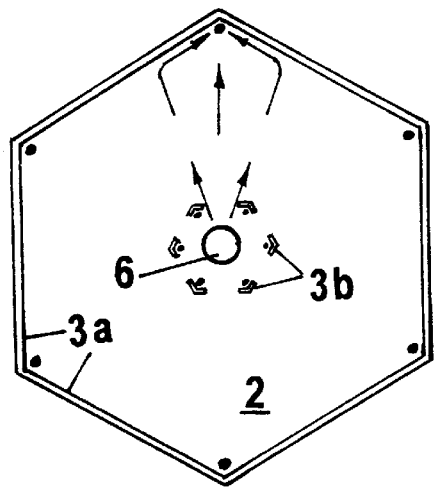
FIG. 4 is a plan view of a bottom pan for uniform distribution of liquid across the fluidized bed.

Referring now to FIG. 4, there is shown an example of a bottom panel 2 with continuous peripheral flow baffles 3a and internal discontinuous baffles 3b. A downcomer 6 is also shown. In operation, the flow from the downcomer strikes the bottom panel and is considerably uniformly deflected to flow horizontally in radial directions. When the horizontal flow reaches the baffles 3b, they intercept a portion of the flow and deflect it in the vertical direction. The flow passing past baffles 3b reaches baffles 3a and is similarly deflected in the vertical direction. Depending on the velocity of flow in the downcomer and sizes of the bottom panel and the flow baffles, a part of the flow may be deflected upwardly at the point of meeting the baffle, however, a significant portion is deflected horizontally towards corners in the flow baffles. In corners, the upflow velocity is more intensive. Points of intensive upflow are marked in FIG. 4 with solid dots. The bottom panel with flow baffles should be designed to produce a dense matrix of upflow points having substantially the same amounts of flow. For the hexagonal panel with flow baffles as shown in FIG. 4, the inside baffles 3b should intercept one third of the total flow from the downcomer 6. The remaining flow will be split into six fractions of two eighteenth of the downcomer flow which will be trippled by the flow from adjacent panels, thus producing the sum equal to one third the downcomer flow in each corner zone of the panel 2. This produces a matrix of upflow points with nodes at the apexes of the uniform triangle. FIG. 4 presents a hexagonal bottom panel 2. Square, circular, and other shape bottom panels can also be used. The method of splitting the downcomer flow into substantially equal and uniformly distributed upflows is adequately and is completely enabling for those skilled in art.

Figure 5:
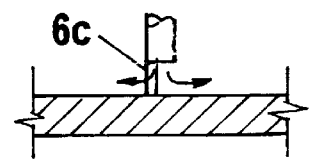
FIG. 5 is a flow baffle incorporated into bottom pans.

FIG. 5 shows and example of a non-clog discontinuous baffle 3b. It consists of two plates having a smooth curved (or inclined straight) leading edge which would not catch and accumulate thread like and similar materials.

Figure 6:
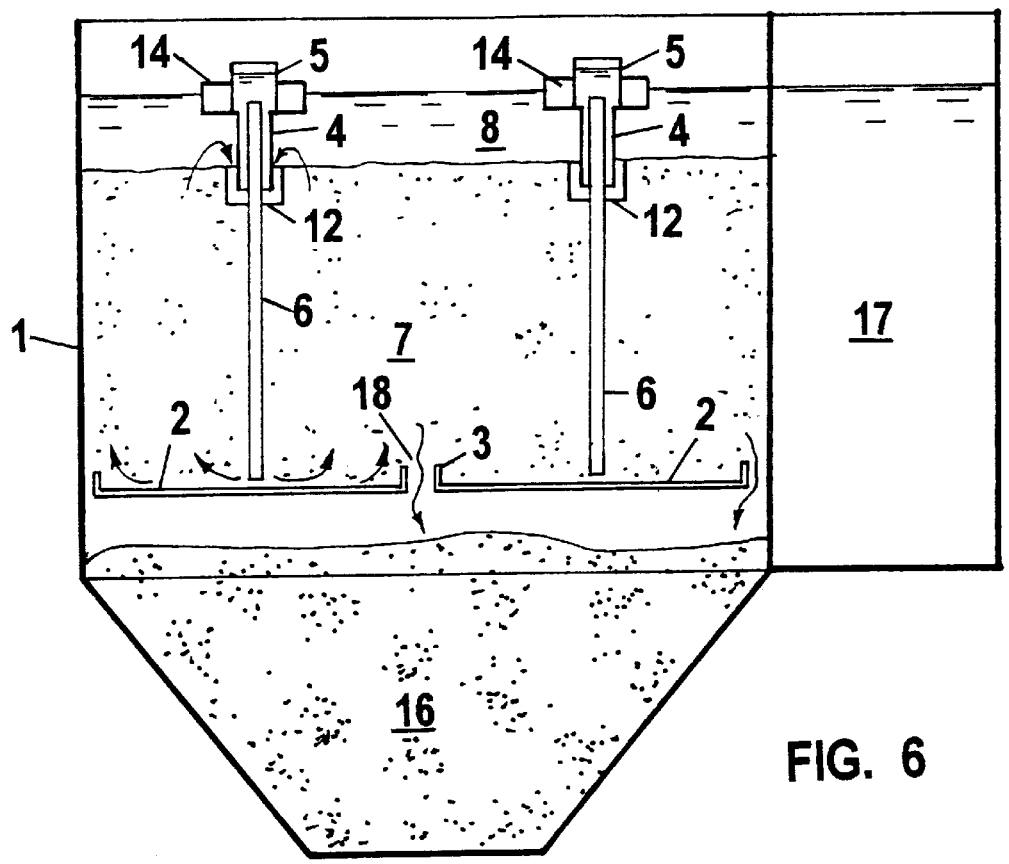
FIG. 6 is an alternative configuration of reactor of FIG. 1 with floating airlift-downcomer assemblies, the additional reaction zones under the fluidized bed and at the side of the fluidized bed reactor.

Referring now to FIG. 6 there is shown a reactor as described in FIGS. 1 and 2 and further provided with sections for special functions. FIG. 6 shows a reactor 1 with fluidized bed 7 and clear layer 8 equipped with floating airlift-downcomer assemblies having a gas separator 12, and airlift 4, a box 5, a downcomer 6 and a float 14. The bottom panels 2 are provided. Optionally, these panels can be attached to the floating airlift-downcomer assembly. The attachment can be, for example, by cables, or by rigid braces (not shown). Gaps 18 can be provided between the bottom panels 2 for passing some particulate materials down into a functional zone 16. Another functional zone 17 can be attached to the side of the fluidized bed reactor 1. Functional zone 16 can be used to treat solid particles generated in the reactor, or used in the fluidized bed. Zone 17 can be a reactor operated in sequence with the reactor 1, either preceding or following it. Operation of the fluidized bed reactor is the same as previously described and will not be repeated. Examples of applications and operation of the system depicted in FIG. 6 are given later.

Figure 7:
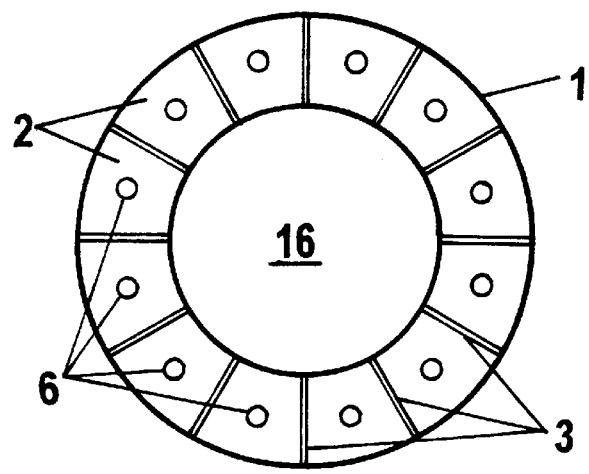
FIG. 7 is a top view of another modification of the fluidized bed reactor with an additional functional zone in the center of the circular reactor.

Referring now to FIG. 7, there is shown a circular fluidized bed reactor 1 with an additional central functional zone 16. The ring between the reactor 1 wall and the central zone is divided into segments accommodating bottom panels 2 with the airlift-downcomer assemblies (not shown). Panels 2 have flow baffles 3. The outer ring is operated as a fluidized bed reactor. Operation of this reactor has been described and will not be repeated. The functional zone 16 can be used as a sequential reaction zone with the fluidized bed reactor or it can be used for treatment of solids produced in the system. Examples of particular applications will be presented in the subsequent section.

EXAMPLES OF APPLICATIONS

The following examples are intended to illustrate the possible areas of application of the present invention. Numerous other applications are possible. The present disclosure is enabling and makes many applications not described here obvious to the skillful in art. The examples given herein should not be taken as constrains of the present invention.

The method and apparatus described in FIGS. 1 and 2, with or without optional features, can be used for adsorption processes, wherein the adsorption media can be granular activated carbon, charcoal, synthetic resins, natural materials, or their functional equivalents. This reactor type can be used for conducting ion exchange with particulate resins, or activated coal, or other similar materials. Many catalytic processes conducted with particulate catalysts in fluidized bed will benefit from this method. Chemical precipitation processes, for example, water softening with calcium carbonate crystallization on seed particles. Stripping carbon dioxide in airlifts is an unexpected benefit in removing the calcium bicarbonate hardness because it reduces the alkali requirements. Growing various crystalline particles can be similarly conducted. The method can be used for suspended sludge blanket clarification in water and wastewater treatment processes with an unexpected benefit: due to the abrupt velocity reduction at the top level of the blanket the loss of solids from the blanket is substantially eliminated. It can also be used in backwash of the water filters with an unexpected benefit: increased scour and dirt detachment from the granular filter media due to in-bed water recycle, especially with mixing cones 9, reduces the amount of fresh water used for backwash. Water filters represent a batch fluidized bed operation.

The fluidized bed reactor can be a biological reactor with either flocculent or granular sludge, or with attached biomass grown on carrier support particles of granular activated carbon, sand, synthetic materials, coal, and other particles presently known for this purpose, or developed in the future. Reactor 1 can be an aerobic or anaerobic reactor. Powdered activated carbon (PAC) can also be used in such reactors.

PAC will be incorporated in the biological flocks, granules, or film. Aerobic reactor can have a diffused air aeration system under or within the fluidized bed, or a separate step of oxygen saturation can be provided and the oxygen rich liquid is fed in the reactor. Flocculent sludge in the upflow of liquid as described in the present invention, and especially with aeration as in aerobic processes and also with digestion gas production as in anaerobic processes, may not develop a distinct upper level. The sludge blanket in such a case can be considerably mixed as in a complete mix reactor, and the clear layer is essentially absent. If needed, the sludge is retained in the reactor with a solid-liquid separator. Particulate material, or at least a part of this material, is recycled together with the fluid being recycled. Herein, such mixed flocculent sludge not forming a distinct upper boundary in the upflow of liquid is also included in the group of the suspended sludge blankets, or fluidized beds.

Reactor 1 can also be a stand-alone anaerobic upflow suspended sludge blanket reactor (USBR), or anaerobic reactor with attached growth with carrier particles. Powdered activated carbon can also be used in such reactors. If economical, the digestion gas can be collected in anaerobic processes. The use of airlift in anaerobic reactor provides additional and unexpected benefit: the excess carbon dioxide, such as generated in system treating carbohydrate and similar waste, is stripped thus substantially eliminating pH drop due to carbon dioxide. This effect is combined with the liquid recycle and is a free benefit. The carbon dioxide stripping can be further improved by providing recuperable abiotic species, for example, calcium and/or iron ions. This process is described in our previous U.S. Pat. No. 5,798,043 which is made a part of this application by inclusion.

Anaerobic fluidized bed reactor 1 combined with a sludge conditioning zone 16 as depicted in FIG. 7 is operated as follows. A portion of the sludge is withdrawn form the reactor 1 and transferred in the sludge conditioning zone 16 where it is retained for a long time. During this time, methanogenic sludge is grown in the sludge conditioner and recycled back in the reactor 1. The benefits of this process are described in our previous U.S. Pat. Nos. 5,514,277, 5,514, 278, and 5,616,241 which are made a part of this invention by inclusion. The circular arrangement of FIG. 7 can also accommodate two-stage anaerobic systems, or two-stage anaerobic-aerobic systems in either sequence.

Anaerobic fluidized bed reactor can also be combined with another biological treatment step 17, and optionally with the sludge conditioner 16 as shown in FIG. 7. Zone 17 can be an aerobic or anaerobic process stage. For example, this can be an aerobic polishing step after the anaerobic reactor 1. Alternatively, zone 17 can be an anaerobic zone, for example, a first stage in two-stage system. Sludge conditioner 16 can be conveniently disposed under the reactor 1 with the sludge transfer to zone 16 through breaks 18 between the panels 2 and sludge return by any conventional lifting means (airlift, pump). Benefits of two-stage anaerobic systems, or two-stage anaerobic-aerobic systems are well known. Benefits of the sludge conditioner are described in the already cited patents.

Reactors of FIGS. 1 and 2 or FIG. 6, or FIG. 7 can also be used in biological-abiotic system with ferric-ferrous cycle for removal of organics, nitrogen and phosphorus, and for reduction or elimination of the excess biosoids. This process is described in the co-pending patent application Ser. No. 09/100,160, now U.S. Pat. No. 5,919,367.

The present reactor can be used as a continuous flow reactor, batch, or semi-batch reactor.

The present method and apparatus can be used for water purification for public or process water supplies, treatment of wastewater, environmental clean up, in chemical, petrochemical, pharmaceutical, food, and other industries.

While the invention has been described in detail with particular reference to preferred embodiments thereof, it will be understood that variations and modifications can be effected within the spirit and scope of the invention as previously described and as defined by the claims. For example, various combinations of the described embodiments can be used. Chemical, physical chemical, biological processes and their various combinations can be carried out simultaneously in the same fluidized bed, for example, activated carbon adsorption, or ion exchange and biological processes can be combined. Fluidized bed reactors can be made as closed vessels and/or operated under elevated pressure and/or temperature.

What is claimed is:

1. A method for fluidization of a particulate bed material in a fluidized bed reactor with an upflow of fluid being treated while passing across said bed from a bottom to an upper level, wherein a step of recycling said treated fluid is provided and further comprising the steps of:
   a) uniformly collecting at least a portion of said fluid above said bed and lifting said fluid by at least one gaslift having an intake at said upper level of said bed; and
   b) recycling said lifted fluid at said bottom of said bed via at least one downcomer extending to said bottom within said bed and being in hydraulic communication with said gaslift.

2. The method of claim 1, wherein said particulate bed material is selected from the group consisting of sand, coal, granular activated carbon, catalyst particles, ion exchange resin, synthetic adsorption media, flocculent mineral particles, flocculent mineral particles with polymers, inorganic particles, organic particles, flocks of biomass, granules of biomass, biomass grown on solid support particles, suspended or emulsified particles, metal particles, and combinations thereof.

3. The method of claim 1, wherein said fluid is selected from a group consisting of water, wastewater, aqueous solutions of inorganic or organic constituents, nonaqueous solutions of inorganic and organic constituents, nonaqueous liquds, nonaqueous solutions of organic or inorganic constituents, and combinations thereof.

4. The method of claim 3, wherein said treatment is selected from the group consisting of chemical treatment, physical chemical treatment, biological treatment, and combinations thereof.

5. The method of claim 4, wherein said biological treatment is selected from a group consisting of at least one aerobic step, at least one anoxic step, a facultative step, at least one anaerobic step, at least one biotic-abiotic step, and combinations thereof.

6. The method of claim 1, wherein the operation of said fluidized bed is selected from the group consisting of continuous operation, Continuous operation with flow equalization, batch operation, semi-batch operation, and combinations thereof.

7. The method of claim 1 and further providing a step of distributing said recycled fluid into essentially uniform upflow streams under said fluidized bed.

8. The method of claim 7, wherein said uniform upflow streams are provided by deflecting said recycled fluid from at least one bottom pan with flow baffles.

9. The method of claim 1 and further providing a step of gas separation.

10. The method of claim 1 and further providing a step of fluid calming at the exit from said airlift.

11. The method of claim 1 and further providing flow rate control in said at least one airlift.

12. The method of claim 1 and further providing a step of recycling at least a portion of said particulate bed material from said upper level to said bottom of said fluidized bed.

13. The method of claim 1 and further providing a step of solid-liquid separation for said fluid above said fluidized bed.

14. The method of claim 1 and further providing a step of mixing said fluidized bed.

15. An apparatus for fluidizing particulate material by a fluid being treated in an upflow fluidized bed reactor with said bed having an upper level and a bottom and said apparatus having a recycle of said treated fluid under said bottom of said bed and further comprising at least one airlift having intake at said upper level of said bed and at least one downcomer in hydraulic communication with said airlift, said downcomer extending essentially to said bottom of said bed.

16. The apparatus of claim 15 wherein said hydraulic communication is a box to which said at least one airlift and said at least one downcomer are attached.

17. The apparatus of claim 15 and further providing a flotation means for said at least one airlift and said at least one downcomer in hydraulic communication with said airlift.

18. The apparatus of claim 15 and further providing a gas separation section.

19. The apparatus of claim 15 and further providing an extension section to said airlift.

20. The apparatus of claim 15 and further providing a bottom pan.

21. The apparatus of claim 20, wherein said bottom pan is provided with flow baffles.

22. The apparatus of claim 21, wherein at least one of said flow baffles is a non-clog baffle.

23. The apparatus of claim 15 and further providing a mixing means within said fluidized bed.

24. The apparatus of claim 15, wherein said downcomer is a telescoping downcomer.

25. The apparatus of claim 15 and further providing treatment zones selected from the group consisting of at least one zone adjacent to said fluidized bed reactor, at least one zone built-in said fluidized bed reactor, at least one zone extended under said fluidized bed reactor, and combinations thereof.

* * * * *